(12) United States Patent
Staub et al.

(10) Patent No.: US 6,891,930 B1
(45) Date of Patent: May 10, 2005

(54) METHOD AND SYSTEM OF PROVIDING CATALOGING AND DETECTING NETWORK FAULTS

(75) Inventors: David B. Staub, Kensington, CT (US); D. Michael Schwab, Brown Deer, WI (US); Jay Alan Hager, Elgin, IL (US)

(73) Assignee: SBC Properties, LP, Reno, NV (US)

( * ) Notice: Subject to any disclaimer, the term of this patent is extended or adjusted under 35 U.S.C. 154(b) by 633 days.

(21) Appl. No.: 09/466,529

(22) Filed: Dec. 17, 1999

(51) Int. Cl.[7] .......................... H04M 1/24; H04M 3/08; H04M 15/00
(52) U.S. Cl. ................... 379/32.01; 379/14.01; 379/133; 379/9; 714/100; 714/48; 714/57
(58) Field of Search ........................ 379/1.01, 9, 9.02, 379/9.03, 32.01, 33, 133, 265.03, 14.01, 112.06; 714/100, 46, 47, 48, 57

(56) References Cited

U.S. PATENT DOCUMENTS

| | | | | |
|---|---|---|---|---|
| 4,467,147 A | | 8/1984 | Rubin ..................... 179/175.2 |
| 4,965,772 A | * | 10/1990 | Daniel et al. ............... 709/224 |
| 5,062,147 A | * | 10/1991 | Pickett et al. ................ 714/57 |
| 5,627,886 A | * | 5/1997 | Bowman .................... 379/111 |
| 5,634,009 A | * | 5/1997 | Iddon et al. ........... 395/200.11 |
| 5,802,145 A | * | 9/1998 | Farris et al. ............. 379/32.01 |
| 5,862,260 A | | 1/1999 | Rhoads ....................... 382/232 |
| 6,079,034 A | * | 6/2000 | VanZante et al. ............. 714/48 |
| 6,141,777 A | * | 10/2000 | Cutrell et al. ................ 714/47 |
| 6,243,838 B1 | * | 6/2001 | Liu et al. ...................... 714/57 |
| 6,249,755 B1 | * | 6/2001 | Yemini et al. .............. 702/183 |
| 6,269,330 B1 | * | 7/2001 | Cidon et al. .................. 704/43 |

* cited by examiner

Primary Examiner—Quoc Tran
(74) Attorney, Agent, or Firm—Law Office of Dale D. Halling, LLC

(57) ABSTRACT

A system (10) for cataloging and detecting network faults, includes a communication interface (12) for receiving a fault message from a network. A parser (14) is connected to the communication interface (12). The parser (14) parses the fault message for an event type. An associative database (16) is connected to the parser (14) and stores a tally for the fault message.

24 Claims, 5 Drawing Sheets

METHOD AND SYSTEM OF PROVIDING CATALOGING AND DETECTING NETWORK FAULTS

FIELD OF THE INVENTION

The present invention relates to network systems and more particularly to a method and system of cataloging and detecting network faults.

BACKGROUND OF THE INVENTION

In complex intelligent networks, network devices generate error messages. These error messages help technicians repair the network devices. However, additional insight can be gained by collecting all the network error messages at a central location. The error message includes event type information and target information. Event type information includes messages such as a certain action cannot be completed. Target type information includes various physical equipment, such as telephone numbers, circuits, equipment ID (identification) and equipment location. Present systems only determine the number of errors for event types. When an event type has a high repeat appearance of counts, then the technician knows that further investigation is required. Unfortunately this requires the technician to manually separate the targets to determine which targets are the likely cause of the errors. This requires considerable effort and time.

Thus there exists a need for a method and system to catalog and detect network faults. The system should also be capable of tracking both event types and targets and automatically determine trouble spots.

DETAILED DESCRIPTION OF THE DRAWINGS

A system for cataloging and detecting network faults, includes a communication interface for receiving a fault message from a network. A parser is connected to the communication interface. The parser parses the fault message for an event type. An associative database is connected to the parser and stores a tally for the fault message. In one embodiment the parser also parses for targets and all combinations of event type and target are tallied. The associative memory allows rapid lookup of any combination of event types and targets. The speed of the lookup is essentially independent of the total number of entries. This means the system does not suffer any performance degradation by tracking all the various permutations of targets and event types.

Figure 1:
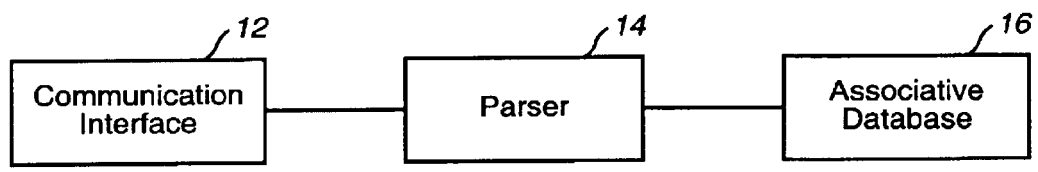
FIG. 1 is a block diagram of a system for cataloging and detecting network faults in accordance with one embodiment of the invention.

FIG. 1 is a block diagram of a system 10 for cataloging and detecting network faults in accordance with one embodiment of the invention. A communication interface 12 receives a fault message from a network. A parser 14 is connected to the communication interface 12. The parser 14 parses the fault message for an event type. An associative database 16 is connected to the parser 14 and stores a tally for the fault message.

Figure 2:
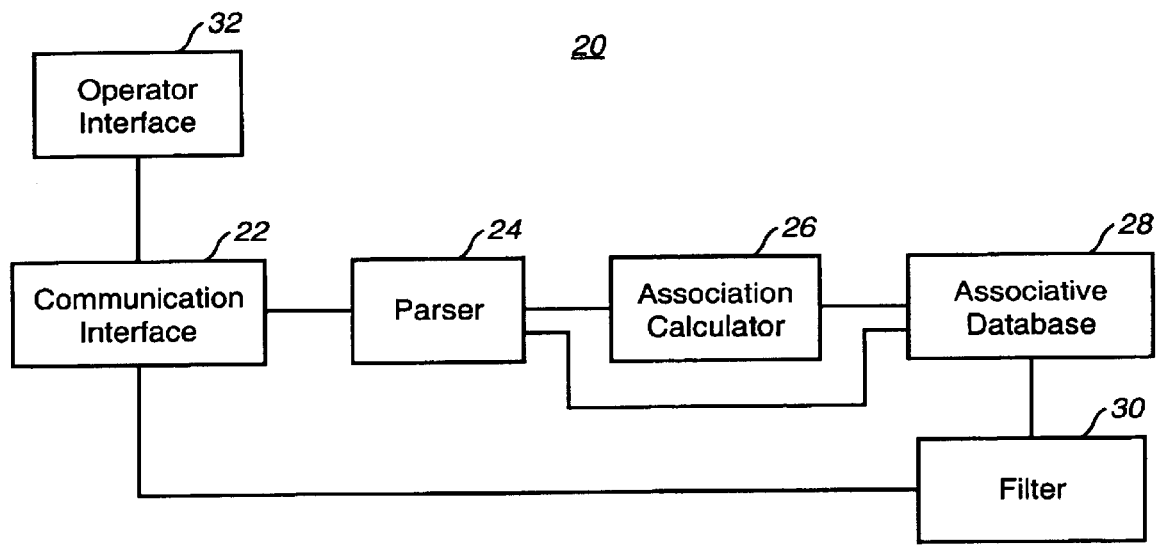
FIG. 2 is a block diagram of a system for cataloging and detecting network faults in accordance with one embodiment of the invention.

FIG. 2 is a block diagram of a system 20 for cataloging and detecting network faults in accordance with one embodiment of the invention. A communication interface 22 receives a plurality of fault messages from a network. A parser 24 is connected to the communication interface 22. The parser 24 parses the plurality of fault messages for an event code, a target and a tally. The parser 24 determines a target type based on the event code. Note that an event code is the type of error that occurred. A target type is the type of equipment (physical asset) associated with the error and the target is a specific piece of equipment (physical asset). An association calculator (e.g., a hashing calculator) 26 is connected to the parser 24. The association calculator 26 determines a key based on the event code. The association calculator 26 determines an association for the key. An associative database 28 is connected to the parser 24. The associative database 28 stores the tally in a location pointed by the association. A filter 30 is connected to the associative database 28. The filter determines a tally threshold for an event code. An operator interface 32 is connected to the communication interface 22. The fault messages are automatically tallied for every permutation of event code, target type and target. This includes cumulative numbers for just the event code, just the target type and just the target. This allows the system to track all the information supplied by the fault messages without human intervention like the prior art systems. A tally threshold is set for every key (permutation of event code, target type and target). Note that the tally threshold can be an absolute number, a number of tallies in a given period, a moving average, etc. or any combination thereof. When a tally threshold is exceeded a network problem message is sent to the operator interface 32. The associative database allows the system to track very large numbers of keys without any database access time degradation. This in turn makes it practical to have a key for every permutation of event code, target type and target. This provides significantly more information about a problem type to the operations personnel responsible for fixing network errors.

Figure 3:
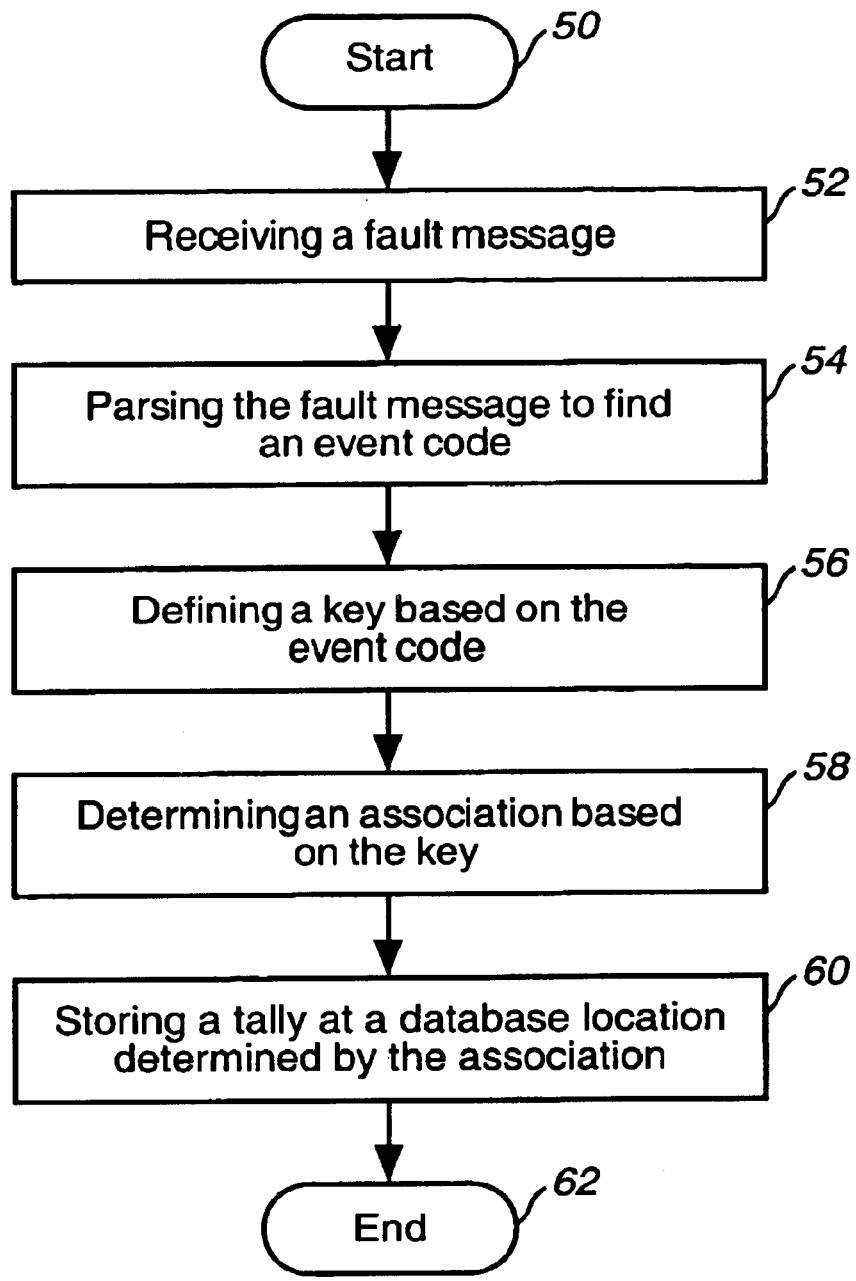
FIG. 3 is a flow chart of the steps used in a method of cataloging and detecting network faults in accordance with one embodiment of the invention.

FIG. 3 is a flow chart of the steps used in a method of cataloging and detecting network faults in accordance with one embodiment of the invention. The process starts, step 50, by receiving a fault message at step 52. The fault message is parsed to find an event code at step 54. A key is defined based on the event code at step 56. An association based on the key is determined at step 58. At step 60, a tally is stored at a database location determined by the association, which ends the process at step 62. In one embodiment, the fault message is parsed to find a target. Based on the target, a target type is determined. In one embodiment the event code and the target are concatenated to form the key. In another embodiment the event code and the target type are concatenated to form the key. In another embodiment, the event code, the target type and the target are concatenated to form the key.

In one embodiment a set of target types is determined based on the event code. A plurality of targets is found using the set of target types.

In one embodiment a threshold is set for a predetermined event type. A lookup on the predetermined event type is performed. Next it is determined if an event type tally exceeds the threshold. When the event type tally exceeds the threshold, a network problem message is sent to an operator's terminal.

In one embodiment a target type threshold is set for a predetermined target type. A lookup on the predetermined target type is performed. Next it is determined if the target type tally exceeds the target type threshold.

In one embodiment a target threshold for a predetermined target is set. A lookup on the predetermined target is performed. Next it is determined if a target tally exceeds the target threshold.

Figure 4:
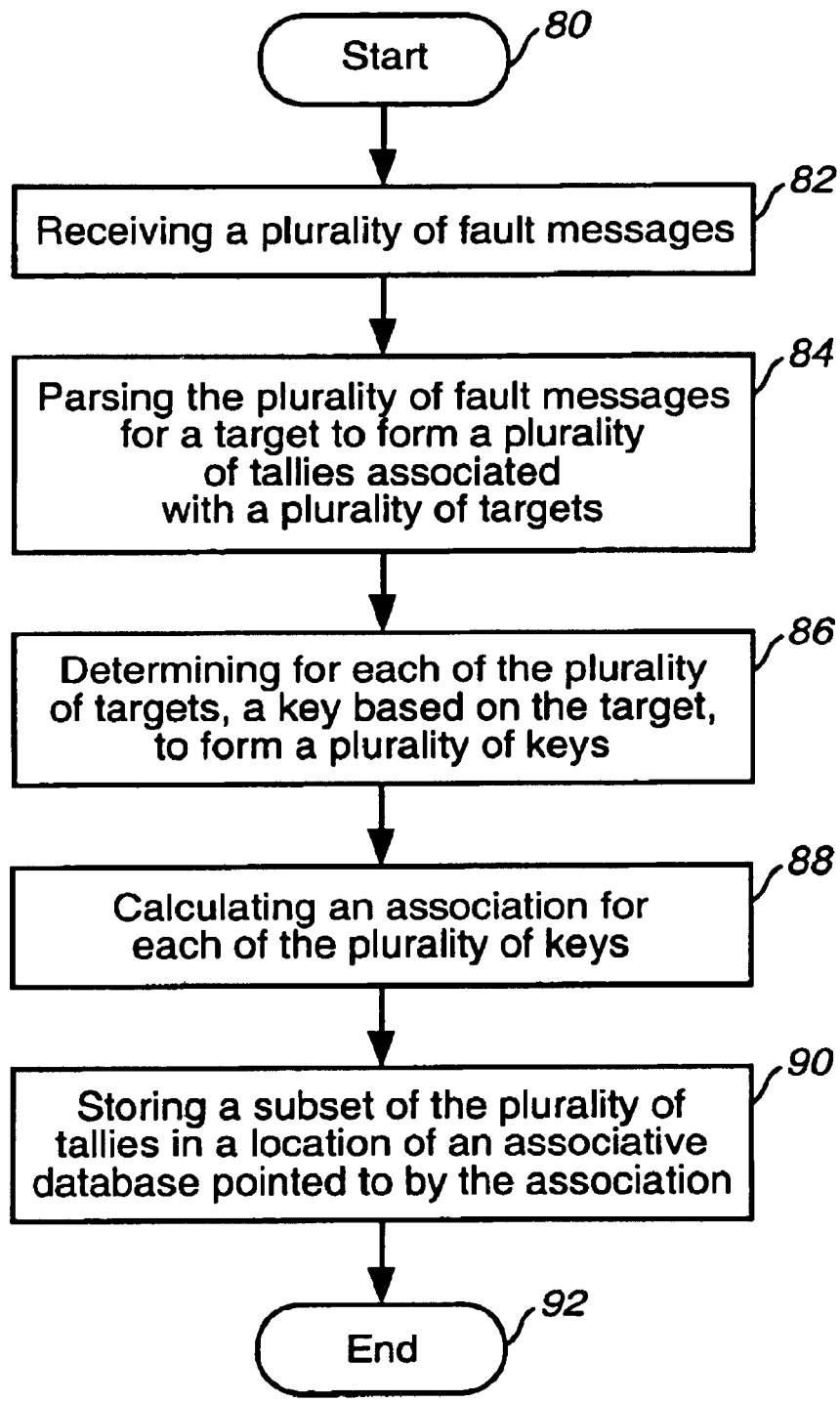
FIG. 4 is a flow chart of the steps used in a method of cataloging and detecting network faults in accordance with one embodiment of the invention.

FIG. 4 is a flow chart of the steps used in a method of cataloging and detecting network faults in accordance with one embodiment of the invention. The process starts, step 80, by receiving a plurality of fault messages at step 82. The plurality of fault messages are parsed for a target to form a plurality of tallies associated with the plurality of targets at step 84. For each of the plurality of targets, a key is determined based on the target to form a plurality of keys at step 86. An association is calculated for each of the plurality of keys at step 88. At step 90, a subset of the plurality of tallies is stored in a location of an associative database pointed to by the association, which ends the process at step 92. In one embodiment, a target threshold is set for one of the plurality of targets. A lookup is performed in the associative database for a tally of the one of the plurality of targets. When the tally exceeds the target threshold, a network problem message is formed.

In one embodiment, the plurality of fault messages are parsed for an event code. A target type is determined for each of the plurality of targets. A key is formed based on a concatenation of the event code, the target type and the target.

Figure 5:
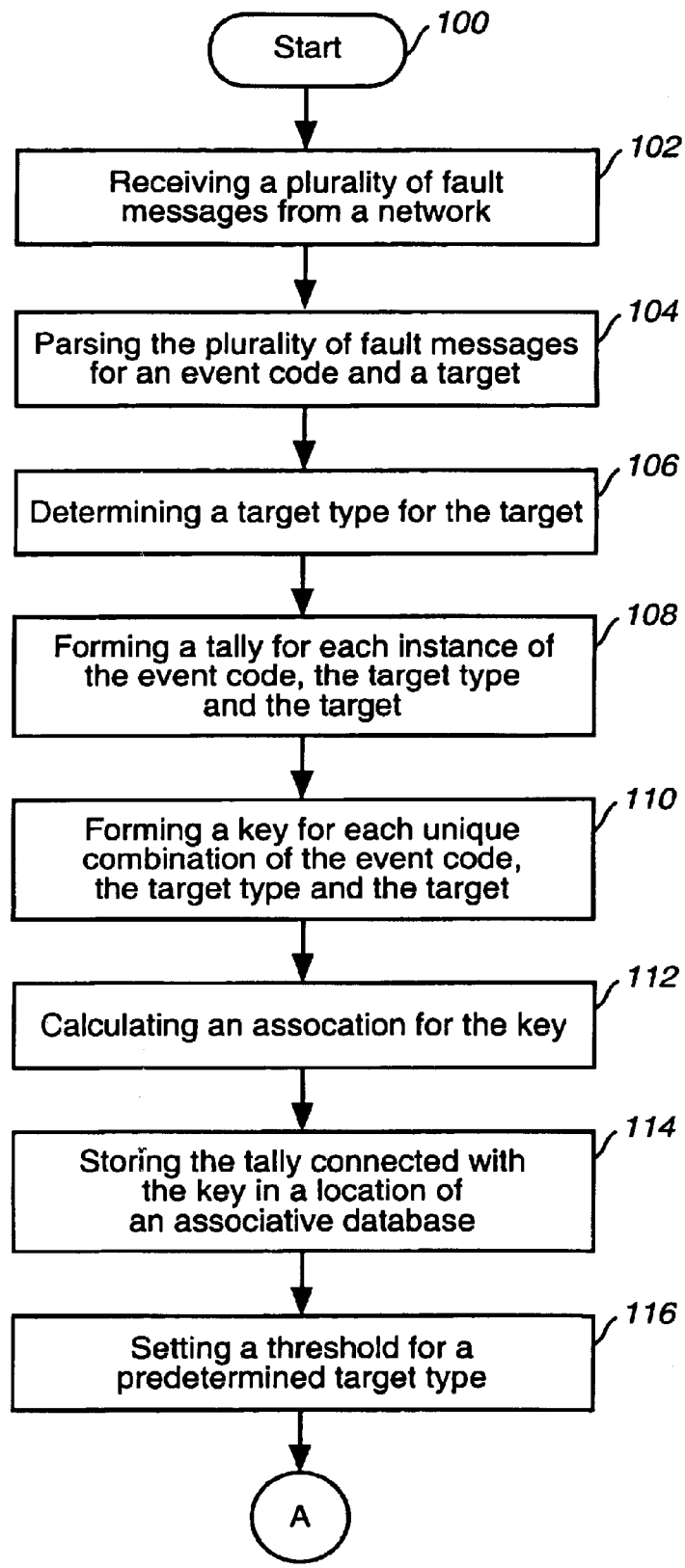
FIGS. 5 & 6 are a flow chart of the steps used in a method of cataloging and detecting network faults in accordance with one embodiment of the invention.
Figure 6:
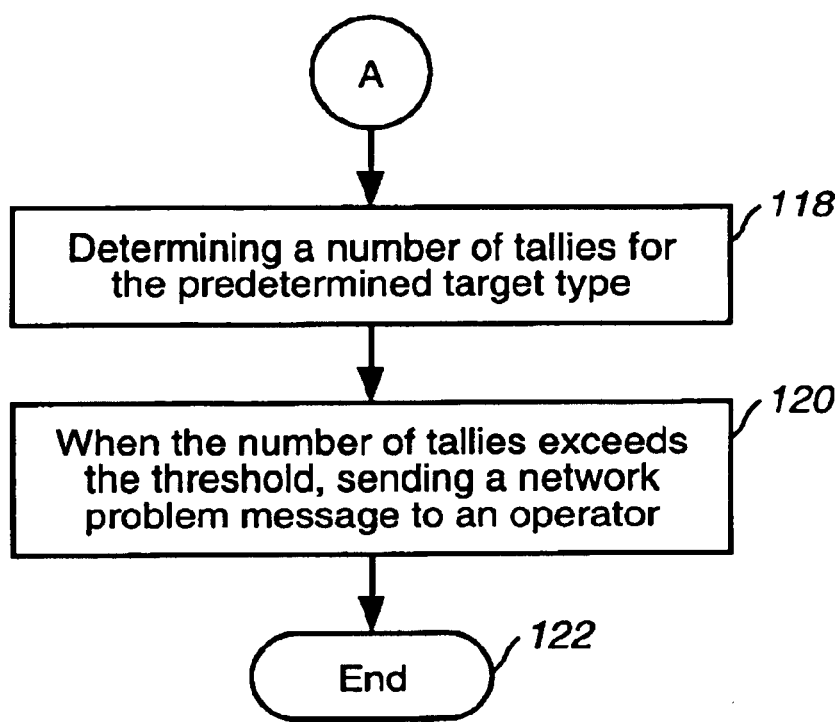

FIGS. 5 & 6 are a flow chart of the steps used in a method of cataloging and detecting network faults in accordance with one embodiment of the invention. The process starts, step 100, by receiving a plurality of fault messages from a network at step 102. The plurality of fault messages are parsed for an event code and a target at step 104. A target type is determined for the target at step 106. A tally is formed for each instance of the event code, the target type and the target at step 108. A key is formed for each unique combination of the event code, the target type and the target at step 110. An association is calculated for the key at step 112. The tally is stored in a location of an associative database connected with the key at step 114. A threshold is set for a predetermined target type at step 116. A number of tallies for the predetermined target type is determined at step 118. When the number of tallies exceeds the threshold at step 120, a network problem message is sent to an operator which ends the process at step 122.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of cataloging and detecting network faults, comprising the steps of:
   (a) receiving a fault message;
   (b) parsing the fault message to find an event code, the event code defining a type of error that occurred;
   (c) defining a key based on the event code;
   (d) calculating a hash of the key to form an association; and
   (e) storing a tally at a database location pointed to by the association.

2. The method of claim 1, wherein step (b) further includes the step of parsing the fault message to find a target, the target is a specific piece of equipment.

3. The method of claim 2, further including the step of determining a target type based on the target.

4. The method of claim 3, wherein step (c) further including the step of:
   (c1) concatenating the event code and the target to form the key.

5. The method of claim 3, wherein step (c) further including the step of:
   (c1) concatenating the event code and the target type to form the key.

6. The method of claim 3, wherein step (c) further including the step of:
   (c1) concatenating the event code, the target type and the target to form the key.

7. The method of claim 1, wherein step (b) further includes the step of:
   (b1) determining a set of target types based on the event code.

8. The method of claim 7, further including the step of:
   (b2) finding a plurality of targets using the set of target types.

9. The method of claim 1, further including the steps of:
   (f) setting a threshold for a predetermined event type;
   (g) performing a lookup on the predetermined event type;
   (h) determining if an event type tally exceeds the threshold.

10. The method of claim 9, further including the step of when the event type tally exceed the threshold sending a network problem message to an operator's terminal.

11. The method of claim 5, further including the steps of:
    (f) setting a target type threshold for a predetermined target type;
    (g) performing a lookup on the predetermined target type;
    (h) determining if a target type tally exceeds the target type threshold.

12. The method of claim 6, further including the steps of:
    (f) setting a target threshold for a predetermined target;
    (g) performing a lookup on the predetermined target;
    (h) determining if a target tally exceeds the target threshold.

13. A system for cataloging and detecting network faults, comprising
    a communication interface for receiving a fault message from a network;
    a parser connected to the communication interface and parsing the fault message for an event type, the event type, defines a type of error that occurred; and
    an associative database connected to the parser storing a tally for the fault message, the associative database having a hashing calculator.

14. The system of claim 13, wherein the hashing calculator forming a key from the event type and determining an association based on the key.

15. The system of claim 14, wherein the association points to a location in the database.

16. The system of claim 13, wherein the parser parses the fault message for a target.

17. The system of claim 13, further including an operator terminal connected to the communication interface.

18. A method of cataloging and detecting network faults, comprising the steps of:
   (a) receiving a plurality of fault messages;
   (b) parsing the plurality of fault messages for a target to form a plurality of tallies associated with a plurality of targets, the plurality of targets each define a specific piece of equipment;
   (c) determining, for each of the plurality of targets, a key based on the target, to form a plurality of keys;
   (d) calculating a hash of the plurality of keys to form an association for each of the plurality of keys; and
   (e) storing a subset of the plurality of tallies in a location of an associative database pointed to by the association.

19. The method of claim 18, further including the steps of:
   (f) setting a target threshold for one of the plurality of targets;
   (g) performing a lookup in the associative database for a tally of the one of the plurality of targets;
   (h) when the tally exceeds the target threshold, forming a network problem message.

20. The method of claim 18, wherein step (b) includes the step of parsing the plurality of fault messages for an event code.

21. The method of claim 20, wherein a target type is determined for each of the plurality of targets.

22. The method of claim 21, wherein the key is based on a concatenation of the event code, the target type and the target.

23. A system for cataloging and detecting network faults, comprising:
   a communication interface for receiving a plurality of fault messages from a network;
   a parser connected to the communication interface, the parser parsing the plurality of fault messages for an event code, a target and a tally, the parser determining a target type based on the event code the event code defines a type of error that occurred;
   a hashing calculator connected to the parser, the association calculator determining a key based on the event code, and the association calculator determining an association for the key;
   an associative database connected to the parser, the associative database to storing the tally in a location pointed to by the association;
   a filter connected to the associative database, the filter determining a tally threshold for an event code; and
   an operator interface connected to the communication interface.

24. A method of cataloging and detecting a network fault, comprising:
   (a) receiving a plurality of fault messages from a network;
   (b) parsing the plurality of fault messages for an event code and a target;
   (c) determining a target type for the target;
   (d) forming a tally for each instance of the event code, the target type and the target the event code defines a type of error that occurred;
   (e) forming a key for each unique combination of the event code, the target type and the target;
   (f) calculating a hash for the key to form the association;
   (g) storing the tally connected with the key in a location of an associative database;
   (h) setting a threshold for a predetermined key;
   (i) determining a number of tallies for the predetermined key; and
   (k) when the number of tallies exceeds the threshold, sending a network problem message to an operator.

* * * * *